United States Patent [19]
Hwang

[11] Patent Number: 6,049,823
[45] Date of Patent: Apr. 11, 2000

[54] MULTI SERVER, INTERACTIVE, VIDEO-ON-DEMAND TELEVISION SYSTEM UTILIZING A DIRECT-ACCESS-ON-DEMAND WORKGROUP

[76] Inventor: Ivan Chung-Shung Hwang, 13072 Stanton, Santa Ana, Calif. 92705

[21] Appl. No.: 08/742,741

[22] Filed: Nov. 1, 1996

Related U.S. Application Data

[63] Continuation-in-part of application No. 08/539,066, Oct. 4, 1995.

[51] Int. Cl.[7] .............................. H04N 7/14; H04H 1/02
[52] U.S. Cl. .............................. 709/218; 348/8; 348/12; 348/13; 455/5.1; 709/219
[58] Field of Search .................................. 348/8, 12, 13; 395/200.34, 200.49; 707/10; 455/5.1; 709/217–219

[56] References Cited

U.S. PATENT DOCUMENTS

| | | | |
|---|---|---|---|
| 4,450,477 | 5/1984 | Lovett | 358/86 |
| 4,531,184 | 7/1985 | Wigan | 364/200 |
| 4,887,204 | 12/1989 | Johnson | 364/200 |
| 4,947,244 | 8/1990 | Fenwick | 358/86 |
| 5,318,450 | 6/1994 | Carver | 434/336 |
| 5,517,652 | 5/1996 | Miyamoto | 395/800 |
| 5,548,724 | 8/1996 | Akizawa | 395/200.3 |
| 5,625,864 | 4/1997 | Budow | 455/4.2 |
| 5,659,539 | 8/1997 | Porter | 395/200.61 |
| 5,729,279 | 3/1998 | Fuller | 348/384 |
| 5,748,897 | 5/1998 | Katiyar | 395/200.49 |
| 5,802,391 | 9/1998 | Hwang | 395/822 |

*Primary Examiner*—John W. Miller
*Attorney, Agent, or Firm*—Leonard Tachner

[57] ABSTRACT

An interactive television system that renders on-demand interactive multimedia services for a community of users. The interactive multimedia is delivered to each user on a TV or on a LAN-node (Local-Area-Network) computer through an "interactive TV channel" created and controlled by a Channel-processor, which can be implemented as either a PC or a high-end workstation. The system employs a direct-access on-demand workgroup server. It is equipped with the primary on-demand multimedia data base stored on a hard disk subsystem that is connected directly to the Channel-processors through an internal workgroup link. Using a no-overhead server technology, the connected workgrouped Channel-processors can all concurrently retrieve and process the data directly from the hard disk subsystem without resorting to a stand-alone server system for data retrieving and downloading. The system also employs peer-to-peer workgroup connectivity, so that all of the workgrouped Channel-processors that are connected to the workgroup server through the internal workgroup link, can communicate with one another.

20 Claims, 15 Drawing Sheets

A typical hotel room layout

MULTI SERVER, INTERACTIVE, VIDEO-ON-DEMAND TELEVISION SYSTEM UTILIZING A DIRECT-ACCESS-ON-DEMAND WORKGROUP

CROSS-REFERENCE TO RELATED APPLICATIONS

The present application is a continuation-in-part of application Ser. No. 08/539,066, filed on Oct. 4, 1995 and entitled "A DIRECT-ACCESS TEAM/WORKGROUP SERVER SHARED BY TEAM/WORKGROUPED COMPUTERS WITHOUT USING A NETWORK OPERATING SYSTEM".

This application matured into a U.S. Pat. No. 5,802,391, issued Sep. 1, 1998.

BACKGROUND OF THE INVENTION

1. Field of the Invention

The present invention relates generally to an interactive television system (iTVsystem) that renders on-demand interactive multimedia services for a community of users. More particularly, the invention relates to a system architecture that comprises an improved multimedia-capable network architecture, which consists of a series of multiple building blocks and multiple intercommunication links that connect all the building blocks together.

In a preferred embodiment, the system uses a workgroup computer. It contains an on-demand workgroup server and 4 workgrouped Channel-processors and the fastest peer-to-peer workgroup connectivity on an internal workgroup link. It provides not only the multimedia on-demand service for the 4 workgrouped Channel-processors from the workgroup server but also the fastest communication among these 4 Channel-processors through the internal workgroup link. The workgroup computer is an important building block for constructing a multimedia-capable network. It creates a better multimedia network architecture where the intensive workgroup on-demand sharing will not generate unnecessary network traffic to hamper the already congested network communication. Most importantly, it will not in any way affect other workgroups' concurrent on-demand sharing activities.

Therefore, every client Channel-processor on the LAN can provide the multimedia on-demand services, and at the same time, interface with LAN servers for other non-on-demand non-time-critical services.

The system uses a set-top-box called iTVpanel. Typically, it contains a keyboard interface, a serial-port interface, a data/control link to its host workgrouped Channel-processor, a video input for CATV RF signal, and an NTSC/PAL output to the television. The user can use this set-top-box to control any one of the Channel-processors that render the interactive TV services whenever he/she wants it.

The system utilizes the Channel-processor to create the "private-viewing" interactive TV channel and the iTV server, which is an iTV application-oriented LAN server, to create a "group-viewing" interactive TV channel. On a private-viewing channel, the user can order any on-demand services for movies, games and shopping. On a group-viewing channel, the user can interact with a number of group-based games, shopping activities and forums. The system can also accommodate the regular CATV channels or Pay-per-view channels, which can be classified as non-interactive "public-viewing channels".

The size of the total population that can be serviced by the system is based on how many interactive TV channels are to be implemented. On an analog carrier for video delivery using RG59 RF cable or microware, the system can create up to 150 channels to serve a group of 1,000 users. On a digital carrier using ATM/Fiber or the like, the system will provide the interactive TV services for a whole community.

2. Prior Art

The merging of computer technology and various forms of entertaining and informational media provides a natural base for interactive multimedia involving a community of users. Such a community of users may, for example, include guests in respective rooms of a hotel. A preferred form of the interactive television system that delivers interactive multimedia on a TV should provide private-viewing interactive TV services, so that the user can order at any time the on-demand services for movies, games and shopping. It should also provide the group-viewing interactive TV services, so that the user can interact with a number of group-based games, shopping activities and forums. From a business standpoint, the preferred iTV system should be easy and relatively inexpensive to install, compatible with existing Cable TV or Air TV services and sufficiently flexible to accommodate a small number of users (i.e., 32) up to a large number of users (i.e., 8,000). Moreover, such systems should cascade themselves easily through the common digital backbone, so that the number of users can be increased without any limitation.

Currently, the iTV service can be rendered based on a "two-layer single-link" client-server network architecture, which consists of a series of client computers and LAN servers, and a single internal network link that connects them all together. In order to provide iTV service to a community of users, the current execution requires use of a costly client computer to be powerful enough to receive the multimedia data stream, generate digital video to display on a TV, and at the same time interface with the user. Also, it requires to implement a costly broader-bandwidth network link to accommodate all the unregulated traffic, such as the client-to-server traffic for the interactivity, the server-to-client traffic for the video delivery and the server-to-server traffic for data exchange. In addition, it requires to use a very powerful LAN server to provide the concurrent multimedia on-demand sharing for all the client computers. But, in reality, the LAN server can never be stable enough to sustain the concurrent multimedia on-demand sharing for all the client computers. Furthermore, it can be proven that LAN servers are simply not ideal for providing the concurrent multimedia on-demand sharing. That is to say, the on-demand multimedia LAN servers are neither technically-feasible nor economically practicable.

Generally speaking, non-multimedia data, such as text-only data, are more likely to be small-volume and short-streamed, while multimedia data, such as digital-audio and digital-video data, are more likely to be large-volume and long-streamed. For example, to generate a one-minute video on a screen, a computer has to constantly retrieve and process the multimedia data from a local CD-ROM, a local hard disk or a LAN server for one minute without stopping.

In order to process the digital multimedia data stream, a double-speed CD-ROM drive, which generates 300 KB/sec throughput, meets the basic requirement to run an MPEG-I digital video (1.5–3 Mbits/sec), so the full-motion full-screen audio/video can then be properly processed and displayed on the monitor. If using MPEG-II (3–6 Mbits/sec), then the throughput requirement is at least 500–600 KB/sec, which is equivalent to what a quad-speed CD-ROM drive can provide.

At present, a hard disk can only provide the maximum random seek throughput at about 2 MB/sec. Even though the data bus can go up to 40 MB/sec or higher, the actual mechanical head of the disk drive can only yield the average access time of 8 ms as of today, which means, if dealing with a non-contiguous byte-stream, it retrieves every single byte at 0.008 sec (125 bytes/sec). Therefore, no matter how fast the hard disk can be improved, it is still a mechanical part and a limitation is inherent.

Data bases are usually stored on the hard disk subsystem that consists of hard disk drives or hard disk arrays. Multimedia data bases, such as MPEG-II based data bases, have to constantly sustain each concurrent sharing at least 500 KB/sec. If the data to be retrieved are on one hard disk, then the hard disk at 2 MB/sec random seek throughput can theoretically sustain only 4 concurrent on-demand "sharings" on a multi-tasking server system. Still, the data have not yet been downloaded onto the client computers.

Though the hard disk array can increase the throughput, it still consists of a series of hard disk drives, which are mechanical parts. The increased throughput of a hard disk array when compared to the hard disk drive is nominal, but the cost increases tremendously.

When the client computer demands multimedia data from the LAN server's data base, the LAN server must:
1) retrieve the data from the connected hard disks and temporarily store the data onto its random-access memory (RAM);
2) download the data from its RAM to the client computer.

The LAN server incurs a lot of overhead when executing the downloading. How severe the overhead is depends on how many client computers are connected to the LAN server. That is the reason why a LAN server that handles the multimedia data transfer from the internal hard disk to the client computer can only sustain less than the theoretical number of concurrent multimedia on-demand sharing, which is four as described above. As a matter of fact, the Novell or the WINDOWS-NT LAN server can only sustain the concurrent multimedia on-demand sharing for two client computers.

Thus, the LAN servers, such as Novell-based or WINDOWS-NT-based are not powerful enough to be on-demand multimedia servers. They can provide only the concurrent multimedia on-demand sharing for two client computers as described above. It is impossible for these kinds of LAN servers to provide the multimedia on-demand sharing for all the connected client computers on a LAN. Even using a more powerful mainframe or a mini-computer as the central multimedia LAN server, the multimedia data base still has to be stored on the hard disk array, which is mechanically constrained to yield only a limited number of the concurrent multimedia on-demand "sharings".

It can be very inefficient and costly to provide a greater number of multimedia on-demand "sharings" by increasing the number of disk arrays attached to the central multimedia LAN server. If by so doing, it will only aggravate the server structure by adding more front-end processors, generate a lot of control/management overhead, worsen the internal data communication, complicate the data base management, and stretch the server to extremes until it is too big to handle and can no longer be expanded at all. This approach is of little value and economically unjustifiable. At present, a lot of these kinds of iTV installation have been proven too costly and still can not provide viable iTV services, mostly due to the fact that the on-demand multimedia LAN servers are simply not technically-feasible if based only on current hard disk technology.

The sequential read/write on a disk drive, which is another data-access method, has better throughput performance than that of the random seek. But, the random seek throughput is more useful because the user can interactively make on-demand inquiries from the client computer, creating the unpredictable data streams, which are totally different from those of a sequential read/write.

The sequential read/write can be useful in providing the video-on-demand, because except for the initial interactivity, most of the time the multimedia data streams are predictable. Video servers, as one kind of LAN servers, are built and operated based on this scenario and they can sustain up to 5 users using video-on-demand service concurrently from one hard disk. By using SCSI to link up a number of disk drives or disk arrays, the video server on a LAN can provide the service to more users at the same time. However, video servers are not ideal to provide highly interactive on-demand services, such as game-on-demand and shopping-on-demand.

Thus, it is not feasible to construct an on-demand multimedia LAN server based on the current hard disk technology. Also, the interactive multimedia/TV service based on the "two-layer single-link" client-server architecture is not going to work seamlessly. Although, the client-server network architecture is capable of delivering the text-based file-server service to all the client computers on a good-sized LAN, it can not overcome its inherent architectural deficiency when dealing with the interactive multimedia. Currently, there are some measures to improve the performance for delivering the interactive multimedia on the existing client-server network. They are:

(1) By using more application-oriented LAN servers, such as media server, video server and CD-ROM server,
(2) by defining a new network protocol called "isochronous" to warrant the minimum throughput to the multimedia-based nodes, so that the client computer in each node will not generate distorted video,
(3) by using the intelligent hub/bridge/router to regulate the internal and external network traffic on different cable segments,
(4) by using a more advanced video-compression method to deliver digital multimedia,
(5) by using a more powerful processor-chip to develop the client-computer used as a set-top-box.

But none of the above resolves the fundamental deficiency of the existing "two-layer, single-link" client-server network architecture in delivering the interactive multimedia.

SUMMARY OF THE INVENTION

Because the multimedia on-demand capability can not be fulfilled by the LAN servers, it is more logical that the primary on-demand multimedia data base be installed locally, where client computers can access it directly.

Because the invention delivers the on-demand interactive multimedia through the "interactive channel", the client computer, which can be either in a format of a PC or a high-end workstation and which is equipped with the capability of creating an interactive channel, is called "Channel-processor".

The present invention employs a local direct-access on-demand workgroup server. It is equipped with the primary on-demand multimedia data base stored on a hard disk subsystem that is connected directly to a number of Channel-processors through an internal workgroup server link.

Using a no-overhead server technology as illustrated in U.S. patent application Ser. No. 08/539,066, the connected Channel-processors can all concurrently retrieve and process the multimedia data base directly from the direct-access workgroup server without resorting to a stand-alone server system for the data retrieving and downloading.

The major advantages using the direct-access workgroup server are:

a) The direct-access workgroup server can be directly accessed by all the connected Channel-processors on an internal workgroup server link, guaranteeing the multiple concurrent multimedia on-demand sharing.

b) The intensive multimedia on-demand sharing, which is done within the workgroup on the internal workgroup server link, does not adversely affect the general network traffic, making the existing network link reliable, manageable and still usable for multimedia purposes.

c) It eliminates the need for an additional system running a network operating system to perform as a workgroup server. This server system would have to be connected to all the workgrouped Channel-processors either through the existing network link, which actually adversely affects the network traffic, or through a new workgroup link, which needs additional linking-interface cards and yields only half of the performance when compared to the direct-access workgroup server Since the current hard disk subsystem containing the multimedia data base can theoretically sustain only 4 concurrent multimedia on-demand sharings as stated earlier, the direct-access local on-demand workgroup server is therefore connected with 4 Channel-processors at present. Later, as hard drives become faster, the direct-access local on-demand workgroup server can also increase the connected number of Channel-processors from 4 to 6, for example, depending on the future disk drive technology.

In addition to the direct-access local on-demand workgroup server, the present invention uses peer-to-peer workgroup connectivity through an internal workgroup connectivity link, so that all of the workgrouped Channel-processors can communicate with one another.

The reason for creating an internal workgroup connectivity link is to reduce the need to conduct peer-to-peer communication among the workgrouped Channel-processors on the bandwidth-limited internal network link, so that the internal network link can connect with more Channel-processors and create a larger system to serve a larger group of users. Certainly, if the user base to be serviced is small and the internal network link can accommodate all the peer-to-peer connectivity traffic, the internal workgroup connectivity link can be excluded for the sake of saving additional cost. But the most ideal case is to combine the internal workgroup connectivity link and the internal workgroup server link into one link, so all the workgrouped Channel-processors that are connected directly to the direct-access workgroup server, can access the workgroup server and communicate with one another on the same internal workgroup link. In so doing, there is no additional cost to construct the workgroup connectivity link and meanwhile the integrity of the system architecture can be maintained. As a result, the unnecessary traffic on the internal network link can be eliminated and a larger iTV user base can be served.

In a preferred embodiment, the present invention employs the TeamPro workgroup computer technology (as first disclosed in U.S. Pat. No. 5,530,892) to construct a TeamPro iTVstation. It contains an on-demand SCSI-based workgroup server, 4 workgrouped Channel-processors and the fastest peer-to-peer workgroup connectivity on the internal workgroup link using SCSI. It provides not only the multimedia on-demand service for the 4 workgrouped Channel-processors to share the SCSI-based workgroup server, but also the fastest communication among these 4 Channel-processors through SCSI. Therefore, it creates 4 interactive private-viewing channels for private on-demand services. Each private-viewing channel can be interactively controlled and operated by one user for multimedia on-demand services, such as movie/video-on-demand, game-on-demand, shopping-on-demand and office/information-on-demand.

In most of the commercial applications, the multimedia on-demand services, such as the interactive TV service in a hotel, are not to be used at all times by one user. For example, not every guest in the hotel room will use the iTV service. Even though, the Channel-processor can only generate one private-viewing interactive TV channel for one user to enjoy, it is not cost-effective to reserve one Channel-processor for only one user. If, for example, the equipment usage rate is to be targeted at ⅛, or 12.5 percent, it is recommended that each Channel-processor be not only shared but also concurrently controlled by 8 users. In the preferred embodiment, the Channel-processor, which is housed in the TeamPro iTVstation and is equipped with multi-tasking capability, can handle 8 up to 16 "interactivities" from 8 up to 16 users concurrently.

The present invention employs an iTVpanel at the user's site. The user uses the iTVpanel to control its host Channel-processor of a particular TeamPro iTVstation through an internal control link. Furthermore, the iTVpanel receives video from any of the interactive TV channels through an internal video link.

The reason for creating an internal control link is to pre-assign the Channel-processor to host a number of connected iTVpanels and to divert the traffic for interactivity away from the internal network link. Also, the reason for creating an internal video link is to divert the most heavy video traffic away from the internal network link. In so doing, more Channel-processors can be hooked up to the internal network link, which means more iTVpanels are available for a larger user base.

There are two methods of delivering video from any of the interactive TV channels to any of the iTVpanels on the internal video link:

(1) By using the analog carrier, such as RF CATV cable or RF microwave;

(2) by using the digital carrier, such as Ethernet, fiber optic ATM (Asynchronous Transfer Mode) or cable modem.

Based on the above scenario, the iTVpanel can be built as either a micro-processor-based or a PC-based instrument that contains the following major interface ports and switches:

1) A series of input control ports for input devices, such as a keyboard port for PC-based keyboard and gamepad, a serial port for mouse and a scanner and a card-reader, and a game port for gamegear. All these input devices can be either wired or wireless;

2) an addressable control/communication port that connects to the host iTVstation's Channel-processor using an internal control link. Some of the implementation examples for establishing the internal control link can be illustrated as follows:

a) The Channel-processor in every iTVstation is physically connected with 8 iTVpanels through an RJ11 cable using Multi-port interface (RS422 or RS232) with physical link address for each iTVpanel;

b) the 4 Channel-processors in every iTVstation are all physically connected with 32 iTVpanels through an Ethernet cable using Ethernet interface with node IP address;

c) the Channel-processor in every iTVstation provides 8 modem receptions for connecting any of the remote iTVpanels equipped with modems through the telephone line using modem interface by dialing each other's telephone number.

Therefore, one TeamPro iTVstation, which is equipped with 4 Channel-processors, can be shared and concurrently controlled by 32 users through the internal control link. Also, the number of users can be flexibly adjusted depending on how high or low the actual equipment-usage rate is.

3) A video input port receives the video signal generated from any of the interactive TV channels through an internal video link. Some of the implementation examples for establishing the internal video link can be illustrated as follows:
   a) A digital-video MPEG-II-based input port based on any of the following interfaces: Fiber Optic/ATM, Ethernet/Fiber Optic, ADSL (Asymmetric Digital Subscriber Line), Cable modem, and Satellite;
   b) an analog-video RF-based input port based on any of the following interfaces: RG59 CATV cable and Microwave;
4) An audio/video output port to the attached display device, such as an NTSC/PAL port to connect to a television or to a LAN-node computer with NTSC/PAL video-capture capability. The iTVpanel is equipped with the capability of converting either the digital or the analog video into an NTSC/PAL video signal;
5) an optional NTSC/PAL video bypass port for channeling other video signal source through, so that the non-interactive "public-viewing channels", such as CATV channels or other Pay-per-view channels, are able to broadcast to the iTVpanel users;
6) an optional remote control interface port that receives the signal generated from the TV remote control;
7) a series of optional data/communication ports to the external devices, such as a TV, a digital TV, a digital video disk, or a computer using interfaces, such as SCSI, Parallel port and Universal Serial Bus (IEEE, 1394);
8) an optional system-exchange panel switch for hooking up with the LAN-node computer's input devices to control both the computer and the iTVpanel. When the switch is activated, those input devices, such as keyboard, mouse and gamepad, will directly interface with the iTVpanel. When the switch is de-activated, those input devices will control the computer.

The present invention also employs the TeamPro workgroup computer technology to construct a TeamPro iTV multi-server system. Each system has 2 iTVservers that create 2 interactive group-viewing channels for group on-demand services, such as group games, group tours and group forums. Each group-viewing channel is programmed and operated by the TeamPro iTVserver itself. The iTVserver can interface simultaneously with a group of users through the iTVpanels and their host Channel-processors. It creates the so-called "participant seats" for these users, whose icons are shown on the screen display. The screen display is broadcast on a particular group-viewing channel by that particular iTVserver to all the iTV-serviced population. The iTVserver can also interact with a number of wait-in-line users, who can later be automatically promoted to be the participants as any empty participant's "seat" become available.

In the preferred embodiment, the present invention also employs a series of TeamPro Multi-server systems to construct the LAN servers, such as backup servers, accounting servers, Intranet servers, application servers, and CD-ROM/DVD (digital videodisk) servers. Each Multi-server system contains two LAN servers. These LAN servers can be equipped with the non-on-demand multimedia data base, so they can provide the Channel-processor on a one-to-one basis with multimedia data upload and download capability. Since these LAN servers are not going to provide the on-demand services, the traffic on internal network link can be reduced drastically. These LAN servers do not interface directly with the user's iTVpanel, only to provide shared data base service to all the Channel-processors and the iTVservers. As a result, these LAN servers can perform better without being subject to demands beyond their capability.

Above all, the TeamPro workgroup computer, in the format of an iTVstation or an iTV multi-server system, is an important building block for constructing a multimedia-capable network. It creates a better multimedia network architecture where the intensive workgroup on-demand sharing from the workgroup server will not generate unnecessary network traffic to hamper the already congested network communication. Most importantly, it will not in any way affect other TeamPro workgroups concurrent local on-demand sharing activities. Therefore, every Channel-processor can provide the multimedia on-demand service to its private-viewing channel for one user and at the same time, interface with the iTVservers and LAN servers to provide group on-demand services and non-demand non-time-critical services for other users that send their service requests to the same particular Channel-processor through their iTVpanels.

The present invention's system architecture is built to guarantee the on-demand interactive multimedia service for a community of users. In summary, the above-mentioned features of the inventive iTVsystem consists of 5 basic building-blocks/components and 5 basic internal links.

As seen in FIGS. 1a, 1b, 1c and 1d, the five basic components are:
1) The Channel-processor that creates the private-viewing interactive TV channel, or the TeamPro iTVstation that is equipped with 4 Channel-processors and creates 4 private-viewing interactive TV channels;
2) the direct-access workgroup server that provides the on-demand multimedia data base for all of the work-grouped Channel-processors or for a TeamPro iTVstation;
3) the iTVserver that is an iTV-application-based LAN server and that creates a group-viewing interactive TV channel;
4) the LAN server that provides data base services for all the Channel-processors and iTV servers;
5) The iTVpanel that is either a PC-based or a microcontroller-based set-top-box and that interfaces with its host Channel-processor via the attached input devices.

The five basic internal links are:
1) The internal workgroup server link that connects between the direct-access workgroup server and all of the work-grouped Channel-processors or a TeamPro iTVstation for workgroup server accessibility;
2) the internal workgroup connectivity link that connects all the Channel-processors either in a workgroup or in a particular iTVstation for within-the-workgroup peer-to-peer connectivity;
3) the internal network link that connects all the Channel-processors, iTVservers and the LAN servers for LAN connectivity;
4) the internal control link that connects between the user's iTVpanel and its host Channel-processor for user interactivity;

5) the internal video link that connects all the Channel-processors, iTVservers and all the iTVpanels for video delivery.

Some embodiments of the invention use fewer components and links. In a preferred embodiment, the workgroup server link is established on a SCSI-II cable using SCSI-II interface for hooking up the SCSI-II-based disk drives easily. Moreover, the workgroup peer-to-peer connectivity link and the workgroup server link can be combined together on the same SCSI cable, so that there is no additional cost incurred and the integrity of the system architecture can be maintained. In a smaller environment, if the internal network link can accommodate all the internal traffic, such as the traffic of internal workgroup connectivity, the traffic of the internal control and the traffic of the internal video-delivery, then there is no need to build those links separately. However, the goal of the iTVsystem is to serve as many users as possible, those additional links are necessary to alleviate the traffic on the internal network link, so that more Channel-processors can be hooked up and more users can be accommodated.

The size of the community to be served by the inventive iTVsystem depends on how many Channel-processors are to be implemented as the private-viewing channels, how many iTVservers are to be implemented as the group-viewing channels and how many iTVpanels are to be implemented and connected to a particular Channel-processor. For example, in a preferred embodiment, the smallest TeamPro iTVsystem consists of one iTVstation, one iTVserver, one LAN server and 32 iTVpanels. Therefore, It provides 4 private-viewing channels and 1 group-viewing channel for 32 TV viewers in a small motel or 32 PC users on a small LAN.

On an analog carrier for video delivery using RG59 RF cable or microwave, up to 150 channels can be accommodated. Then, the ideal analog TeamPro iTVsystem can be constructed to implement 32 iTVstations, 20 iTVservers and 1,024 iTVpanels, which provides 128 private-viewing channels and 20 group-viewing channels for more than 1,000 TV viewers in a 1,000-room hotel or 1,000 PC users on a LAN. Also, on a digital carrier for video delivery using Fiber Optical cable/ATM (SONET, Synchrous Optical Network with Optical Carrier ranging from OC-3 to OC-48), up to 1,200 channels can be accommodated per cable segment. The ideal digital TeamPro iTVsystem can then be constructed to implement 250 iTVstations, 200 iTVservers and 8,000 iTVpanels, which provides 1,000 private-viewing channels and 200 group-viewing channels for 8,000 households in a community.

Furthermore, by using a digital intelligent switching hub, 8 different segments of fiber optic cables can be linked together, creating an external network link that connects to other iTVsystems or other network servers on a WAN (Wide-Area-Network), and providing an iTV-serviced household population up to 64,000. In so doing, any particular channel in one segment can be accessed by any household in another segment. In addition, by linking more digital intelligent switch hubs, the iTV-serviced population can be increased accordingly. Whenever the Fiber Optic (SONET) Wide Area Network (WAN) backbone is established, the TeamPro iTV services can be rendered not only to the local community, but to the entire WAN area.

The present invention employs its system operation and integration software based on its system architecture. It is designed and developed to accommodate the concurrent usage for the whole iTV-serviced population at the same time, so that every user can be attended to. For each building block, the software involves the OS, the application and the user's GUI/browser interface. For each internal link, the software involves the communication protocol and connectivity. Also, for the external link, the software involves the LAN/WAN communication.

Every user's request from the iTVpanel will be handled immediately by the inventive TeamPro iTVsystem. The user will be allocated with either a private-viewing channel or a participant seat on a group-viewing channel. If not, then the user will be given the option to scan through all the interactive group-viewing channels and choose the desired one to stay and become a wait-in-line viewer who later can be promoted to be a participant.

The TeamPro iTVsystem allocates its resources intelligently by resorting to the workgroup connectivity first and then the network connectivity, creating a well-structured and well-managed iTV service operation. For example, If one Channel-processor is physically connected with 8 iTVpanels through RJ11, if this particular Channel-processor's only private-viewing channel has been occupied, any additional inquiry from the same 8-user group for the private-viewing channel will be directed by that particular Channel-processor to control the next available private-viewing channel created by the other Channel-processor in the same iTVstation. All the communications within the iTVstation are done on the internal workgroup link using SCSI. As a result, the network traffic is not hampered and all the other iTVstations' workgroup communications are not in any way affected.

The iTVpanel can be constructed from a low-cost microcontroller-based version to a more function-abundant PC-based version. If it is PC-based and it connects with its host Channel-processor through Ethernet, then these iTV-panels can receive the adequate data stream with broader data bandwidth from their host Channel-processor and provide a local interactive capability for the user to take advantage of. This additional capability is dubbed "the local channel". The limitation of this kind of "local channel" is that it will not always be multimedia-capable, because its host Channel-processor can be too busy in providing the private-viewing channel and redirecting possibly all the inquiries from its connected iTVpanels to the desired destinations. Nonetheless, the "local channel" is capable of executing PC-based applications, such as games, Internet browsing, and non-video-on-demand services, providing the user with more options, in addition to the TeamPro iTV private-viewing and group-viewing channels.

Once all the private-viewing channels in the same iTVstation are occupied, then any additional inquiry for the private-viewing channel will be directed to control the next available private-viewing channel in another iTVstation that has an unused private-viewing channel. This auto-switching capability of the inquiry from the iTVpanel between its host Channel-processor and the other to-be-connected Channel-processor, no matter whether it belongs to the same workgroup or not, is totally transparent to the user, enabling a better equipment usage rate for the entire installation site.

Once all of the workgroup Channel-processors of the entire site are occupied, any additional user will be directed to the iTVserver, where the user can explore the group on-demand services and at the same time, wait for any Channel-processor to become available. Alternatively, users will be first directed to the iTVservers for the group on-demand services and then wait for any Channel-processor to become available for the private on-demand services.

Therefore, every user will be attended by the TeamPro iTVsystem and the user base can be enlarged by 8 to 16 fold, depending on the user's actual equipment usage rate. Most importantly, the per-user cost of the equipment and the installation can be lowered drastically.

The only disadvantage to this workgroup-based iTVsystem architecture is that there are too many duplications of the same data stored in every local on-demand workgroup server. However, disk drive capacity is getting larger and less expensive (for instance, a 5.25-inch full-high hard disk can accommodate up to 23 Gigabytes for less than $150 per Gigabyte) and the technology of the iTVpanel can redirect the control to the specific application workgroup server, which reduces the need for the redundant data duplications. Thus, the increased hard-disk cost for installing a direct-access workgroup server in each TeamPro iTVstation is nominal.

In a typical installation site, every service unit/room will be equipped with a iTVpanel, which has a series of input devices, such as a keyboard, a mouse, and a gamepad. The user can easily direct the cursor on the screen to the desired on-demand service and click to activate it whenever he/she wants.

The TeamPro iTVstation's 4 Channel-processors can be used as 4 regular PCs, which can send/receive fax and e-mail, access the Internet or on-line computer services, and execute PC-based software applications.

The TeamPro iTVstation's direct-access on-demand workgroup server can be configured to provide from 24 hours up to 120 hours of interactive television programs, ranging from education to entertainment.

The TeamPro iTVstation and the TeamPro iTVservers located on the premises, can be linked through the external link to the LAN servers in other locations through WAN connectivity for downloading and accessing additional interactive television programs.

The TeamPro iTVstation as well as the TeamPro multi-server system, housed in a small PC tower chassis called TeamChassis (as described in detail by U.S. Pat. No. 5,577, 205, operates automatically and consumes only 300 watts. The TeamPro iTVstation saves energy and can be placed at any location because of its small footprint.

The TeamPro iTVstation's direct-access on-demand workgroup server is described in detail in U.S. patent application Ser. No. 08/539,066 filed on Oct. 4, 1995 of which the present disclosure is a continuation-in-part. The content of that prior application is hereby incorporated herein by reference.

The invention can be configured for use by much larger groups such as entire communities having as many as 64,000 users. The fully-integrated iTVsystem for the community employs public and private PBX facilities with either analog modems or ISDN (Integrated Service Digital Network) terminal adapters, and delivers video on any of the high-speed data-communication backbones, such as Fiber Optic/coaxial, Fiber Optic/ATM (Asynchronous Transfer Mode), SONET (Synchrous Optical Network), or ADSL (Asymmetric Digital Subscriber Lines) or Cable Modem.

The inventive system architecture solves the three fundamental problems of rendering the on-demand interactive multimedia on a LAN:
(1) The unstable on-demand multimedia LAN servers;
(2) the unregulated traffic on the already-congested internal network link; and
(3) the deficiency of the "two-layer, single-link client-server network architecture using only two building blocks, i.e. the client computers and the LAN servers, on a single internal network link.

The invention employs a series of inventive "direct-access workgroup servers" for workgrouped Channel-processors to provide the guaranteed on-demand interactive multimedia services, creates multiple inter-communication links to alleviate and regulate the traffic on the internal network link, and enables every full-fledged Channel-processor to be controlled by a number of set-top-boxes also referred to herein as iTVpanels installed at the various users' sites, so that a better equipment-usage rate and a lower per-user cost can be achieved. The invention creates a more efficient and cost-effective way to render the on-demand interactive multimedia/TV services for a community of users, because of its inventive "multi-layer multi-link" network architecture using multiple building blocks, such as set-top-boxes, Channel-processors, direct-access workgroup servers, iTVservers and LAN servers, on multiple internal links.

BRIEF DESCRIPTION OF THE DRAWINGS

The aforementioned aspects and advantages of the present invention, as well as additional aspects and advantages thereof will be more fully understood hereinafter, as a result of a detailed description of a preferred embodiment thereof, when taken in conjunction with the following drawings in which:

FIG. 1, comprising

DETAILED DESCRIPTION OF A PREFERRED EMBODIMENT

Reference will be made first to an embodiment of the invention for groups up to about 1,000 users and illustrated in FIGS. 1–7.

The preferred TeamPro iTVsystem (see FIG. 4) comprises a series of iTVstations (FIGS. 3a and 3b) that are built-in with four Channel-processors (133 MHz Pentium processor, 8 MB RAM, 2 GB Hard Disk Memory, Windows 95) and the built-in direct-access on-demand workgroup server with 2 @ 9 GB SCSI drives, and a series of the TeamPro Multi-server system (FIG. 4) that contains two iTVservers (166 MHz Pentium processor, 16 MB RAM, 9 GB Hard Disk Memory, Windows NT 4.0). The TeamPro Multi-server system can also be configured as the LAN servers that provide shared data base service for all the Channel-Processors and iTVservers. Each Channel-processor has an 8-port multi-port serial interface card. Each port is connected to an iTVpanel (FIGS. 6a and 6b) through an RJ11 cable. The iTVcontroller (FIG. 7) is connected to the iTV-panel keyboard port and is the control pad for the users.

A Preferred Teampro iTVSystem for Hotels

Figure 1A:
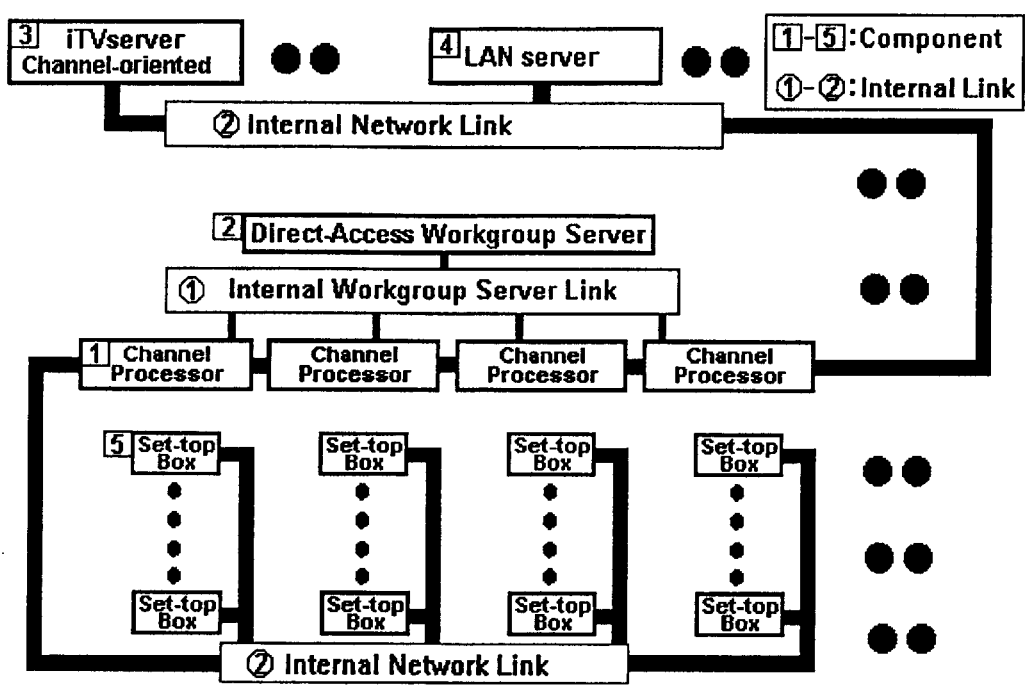
FIGS. 1a, 1b, 1c and 1d, is a block diagram of an interactive multimedia/television system architecture in accordance with four different embodiments of the present invention.
Figure 1B:
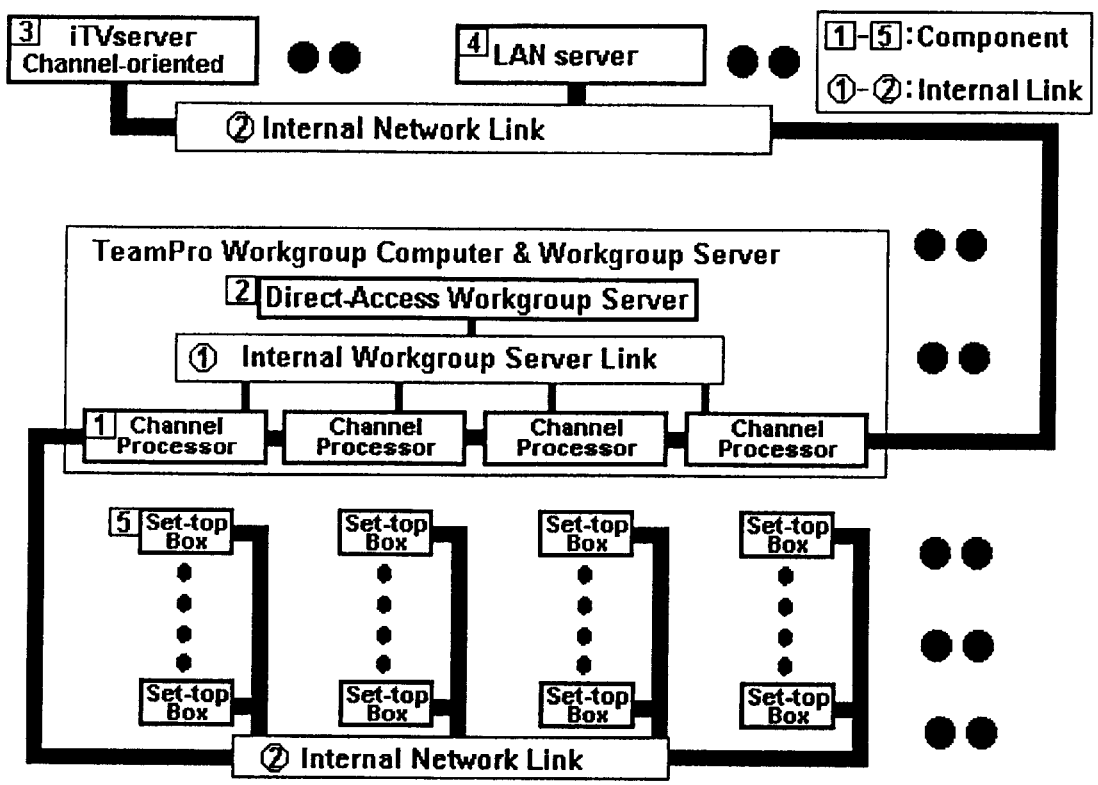
Figure 1C:
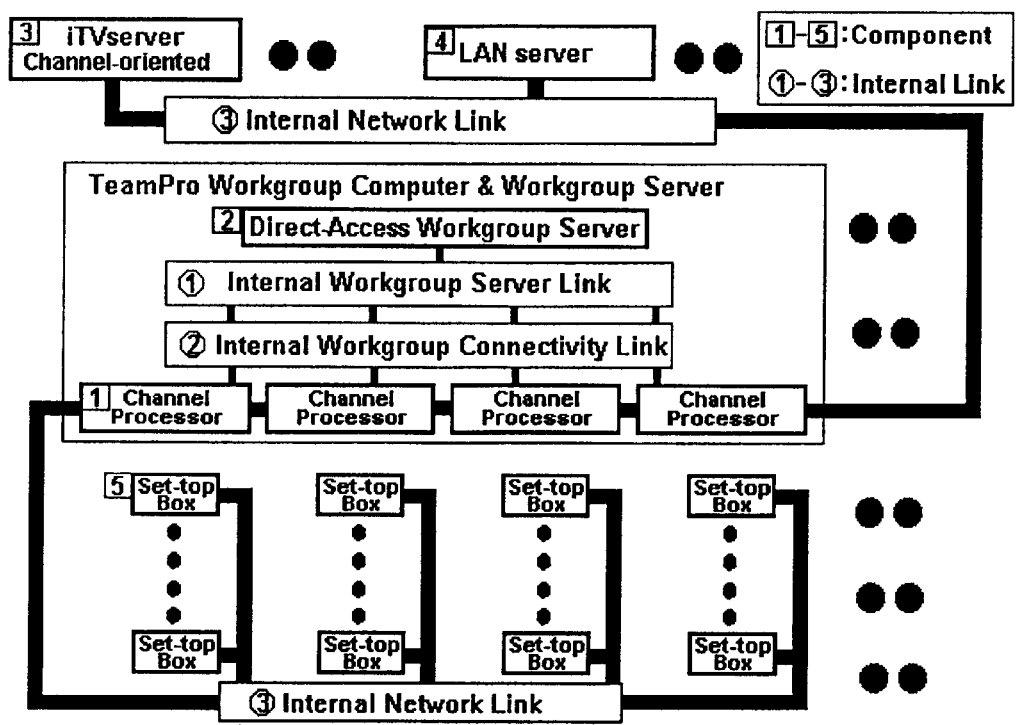
Figure 1D:
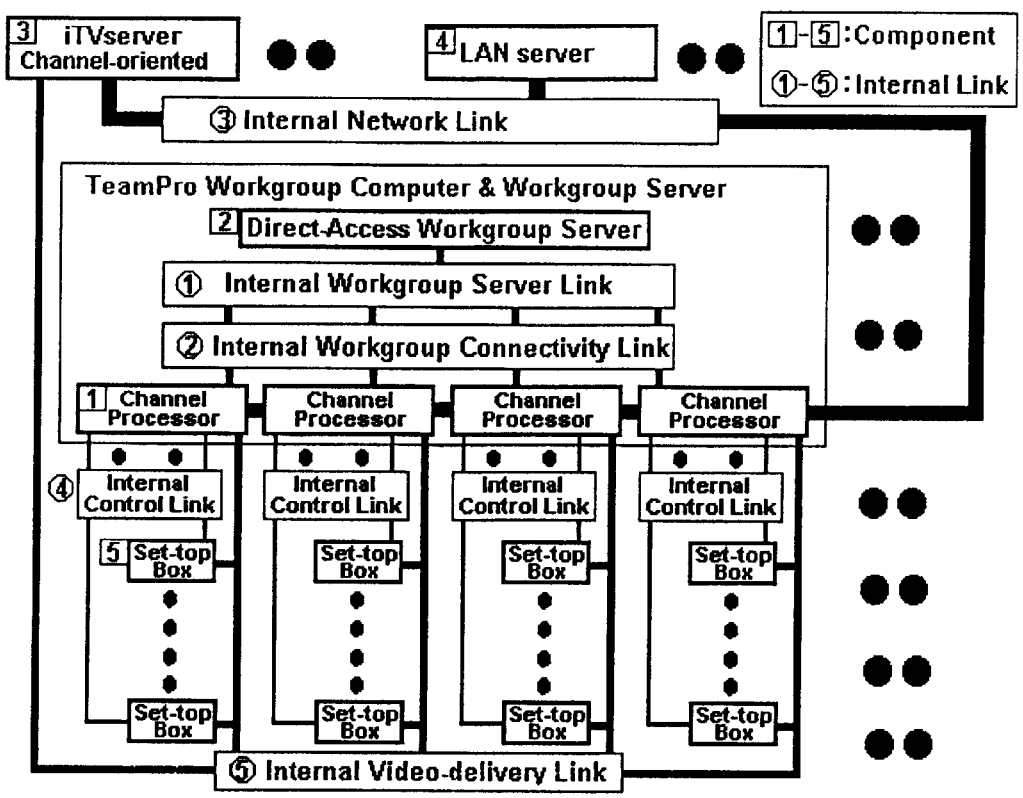
Figure 2:
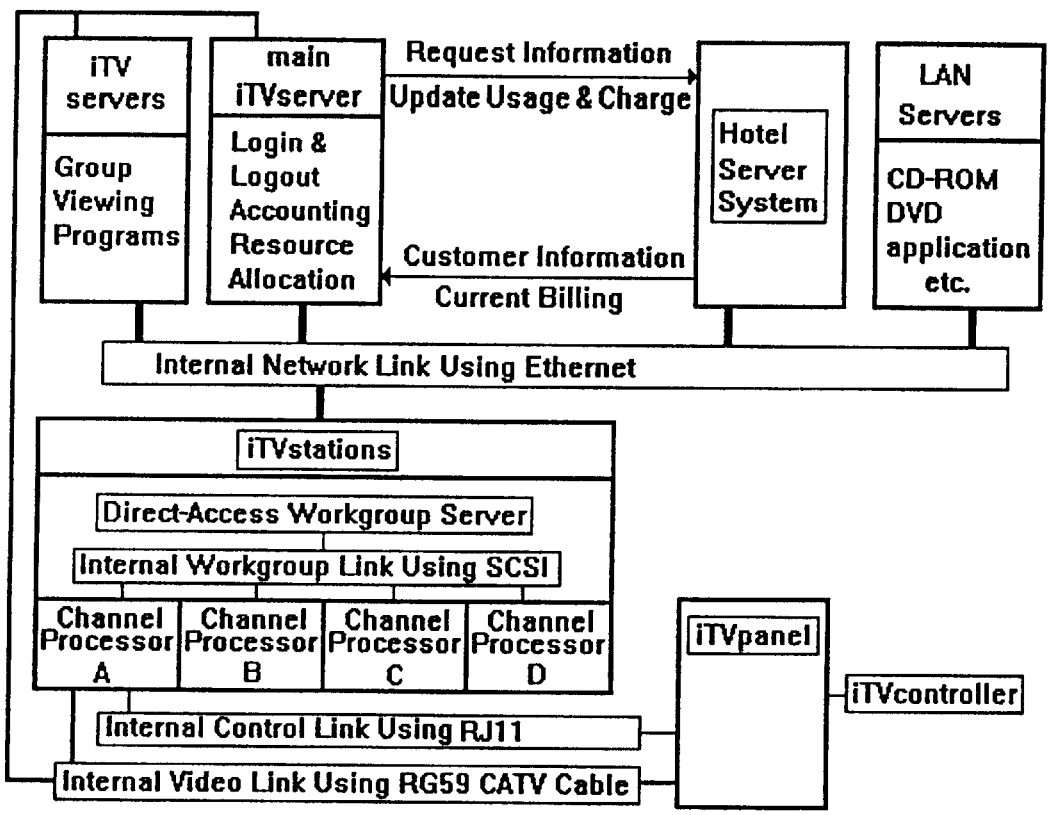
FIG. 2 is a block diagram of the system operation and the integration of the invention using a hotel as a typical installation site.

FIG. 2 illustrates a typical TeamPro iTVsystem installed in a hotel. It comprises a main iTVserver that contains database and handles user log-in and log-out, Channel-processors' inquires and resource allocation, usage record and accounting, and database interface with the hotel computer system. The other iTVservers contain the group programs and they have an MPEG-I playback card for displaying group-viewing programs. The iTVstation contains a local workgroup on-demand multimedia database on a SCSI disk shared by the four Channel-processors. Each Channel-processor handles 8 iTVpanel interfaces and have an MPEG playback card for private viewing of movie-on-demand. The iTVservers and iTVstations are connected through LAN using Ethernet.

The TeamPro iTVsystem provides the following programming for customers:
1. Group-viewing programming:
    a) programming introduction;
    b) group games, forum, etc;
    c) group shopping;
    d) options to go into the private-viewing programming;
2. Private-viewing programming:
    a) Movie on-demand;
    b) Video games;
    c) Electronic shopping;
    d) Hotel information and services;
    e) Remote office (PC-applications, Modem/ISDN sharing, fax, Internet).

All the group-viewing functions are handled by the iTVserver and all the private-viewing functions require a dedicated Channel-processor for each customer. The operations required for each of the programming activities is discussed hereinafter.

Figure 3A:
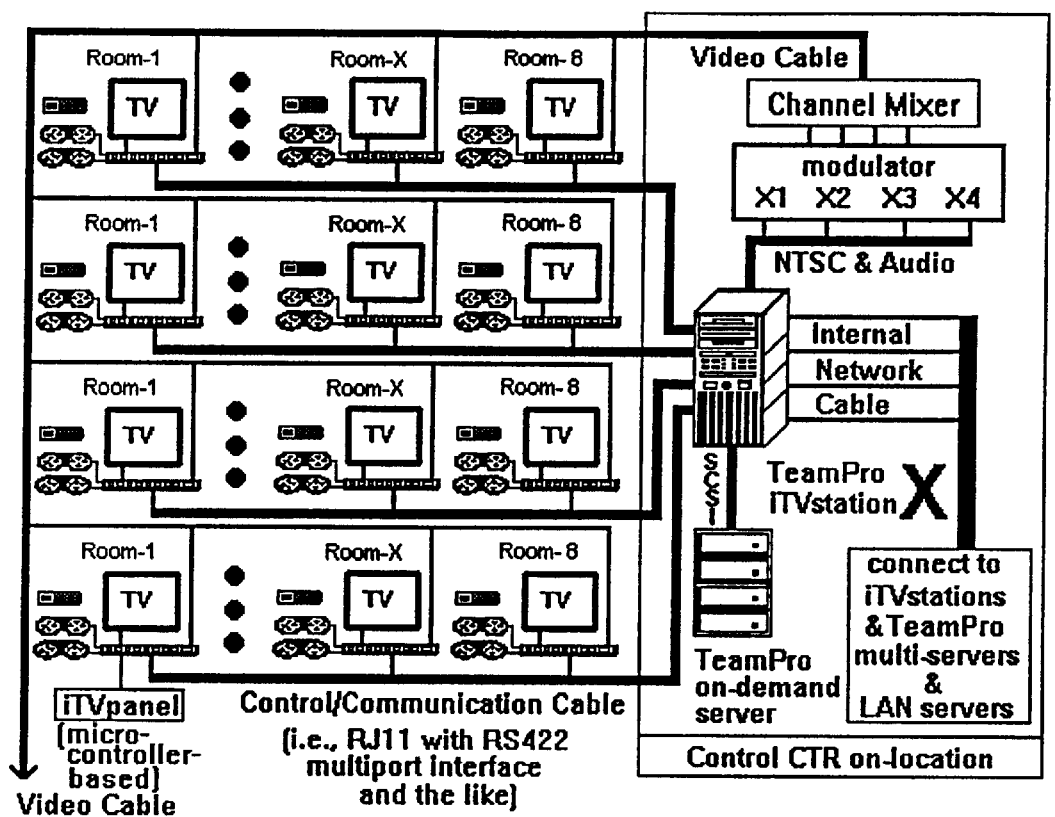
FIG. 3a is a block diagram of the present invention illustrating the basic building block of the iTVsystem: the iTVstation using a micro-controller-based iTVpanel thereof in a typical system installation for 32 up to 64 users.
Figure 3B:
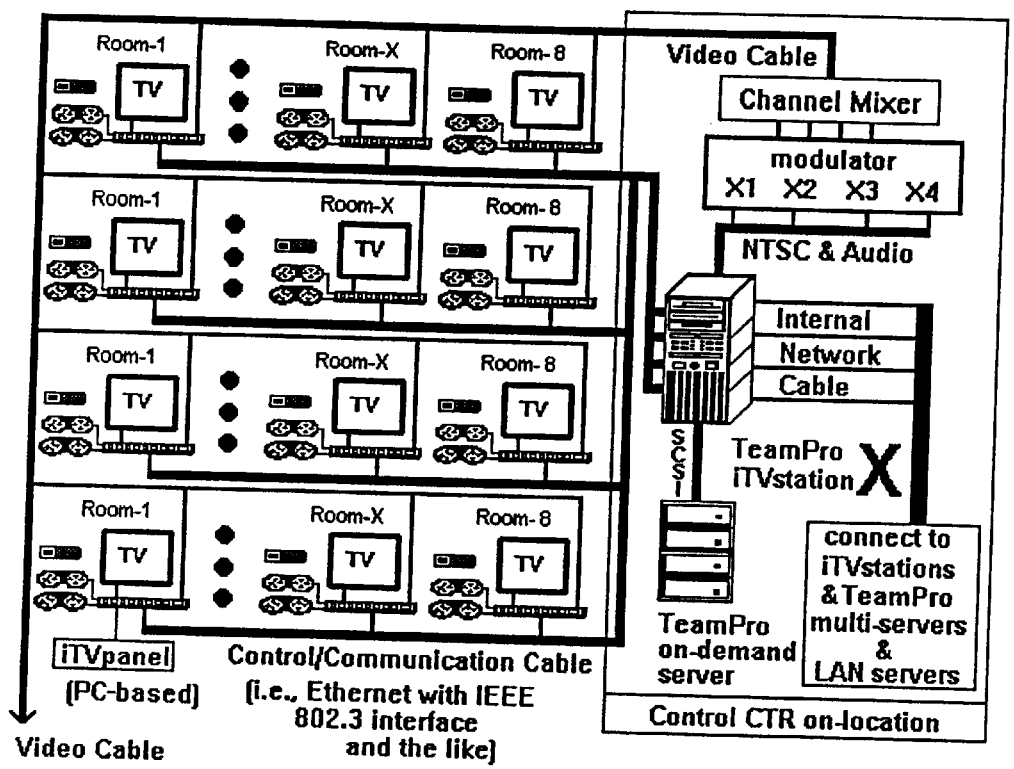
FIG. 3b is a block diagram of the present invention illustrating the basic building block of the iTVsystem: the iTVstation using a PC-based iTVpanel thereof in a typical system installation for 32 up to 64 users.
Figure 4:
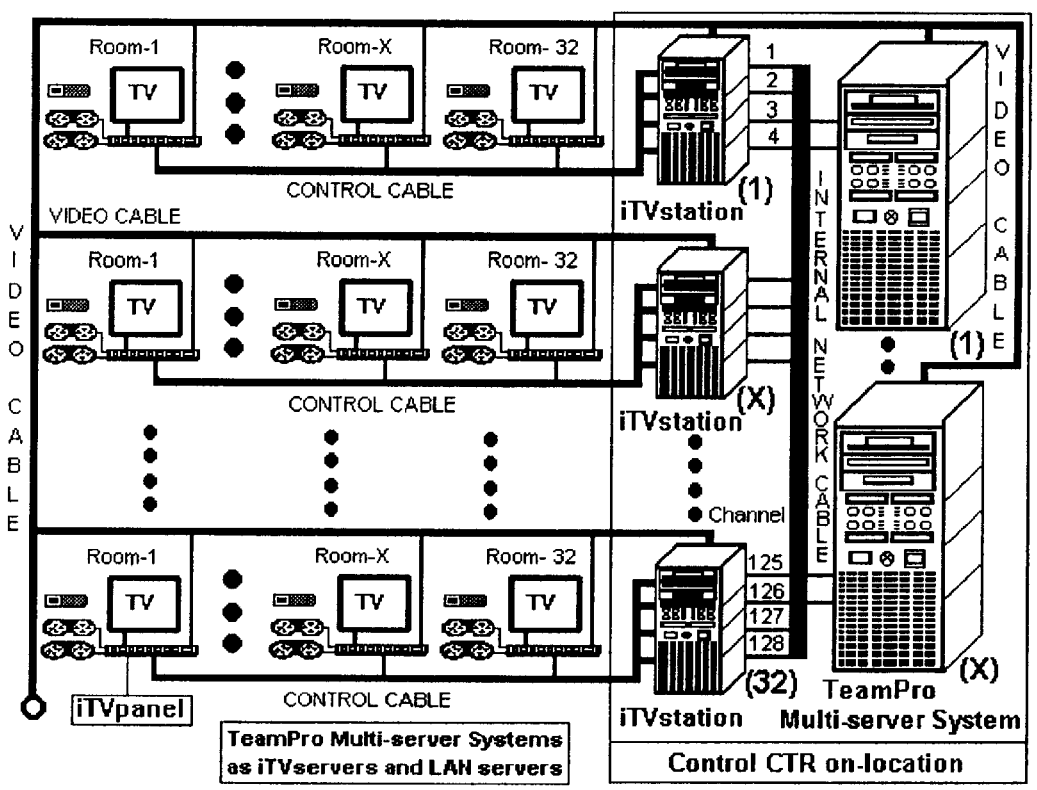
FIG. 4 is a block diagram of the present invention illustrating the distribution of components thereof in a typical iTVsystem installation for up to 1,000 users.

As shown in FIGS. 3a, 3b and 4, the basic configuration of the TeamPro iTVsystem of FIGS. 1a, 1b, 1c and 1d may be configured respectively for from 32 to 1,000 users with only internal connections. In the system of FIG. 3a, there are 32 televisions in 32 individual rooms each TV being connected (as shown in FIGS. 1a, 1b, 1c and 1d) through iTVpanel to a Channel-processor which resides in an on-location control center. Thus there are four Channel-processors, preferably connected for operation in a single chassis PC system as disclosed in the parent of this application. Those four Channel-processors are connected to a local on-demand multimedia workgroup server also housed in the same chassis. The television programming (NTSC and audio) is transmitted through video cable after suitable TV tuning/modulation and mixing in a well-known manner. Internal network cable connects the iTVstation of FIGS. 3a and 3b to other iTVstations and a plurality of iTVservers. In this manner, much larger groups can be accommodated by the iTVsystem of the invention. For example, the 32 TV iTVstation of FIGS. 3a and 3b is replicated 32 times in the 1,000 TV system of FIG. 4 wherein there are 32 iTVstations and 10 iTVservers and a number of LAN servers that can be placed on the internal network link.

Figure 5:
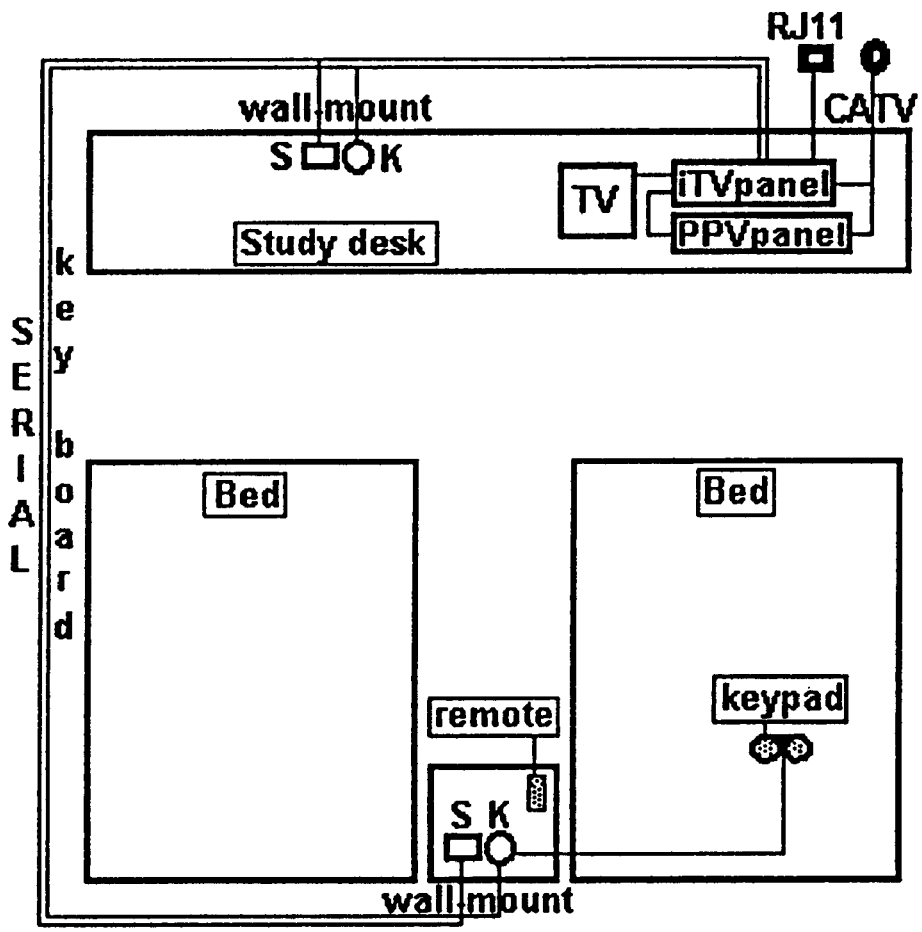
FIG. 5 is a block diagram illustrating a distribution of components of the invention using an individual hotel room as a typical service unit.

FIG. 5 illustrates a typical room layout in the small group version of the invention contemplated for hotel room operation. As seen therein, the television is connected to the iTVpanel (see FIGS. 6a and 6b) which uses an RJ11 connection for control signal communications and a CATV (coax) connection for video signal communications. Separate serial and keyboard interfaces available at wall mounts within the room, provide respective connection for the iTVcontroller and optional keyboard.

Figure 6A:
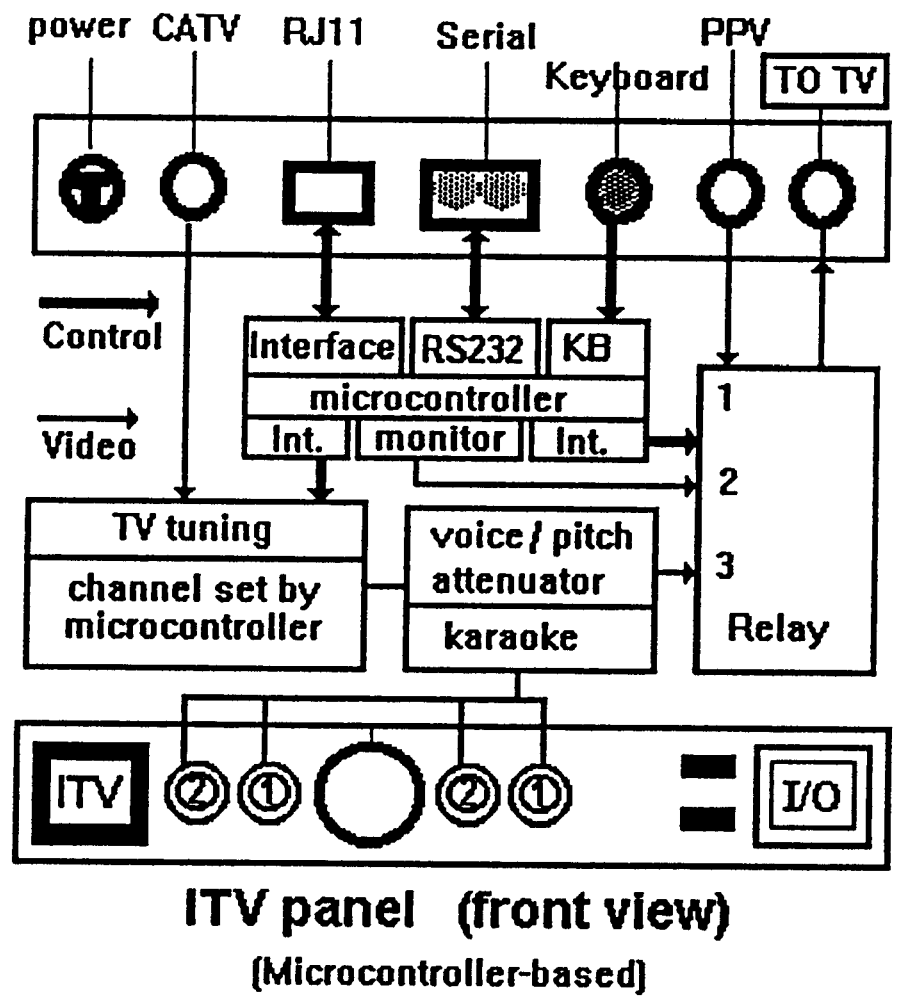
FIG. 6a is a block diagram of a micro-controller-based iTVpanel in accordance with one embodiment of the present invention.
Figure 6B:
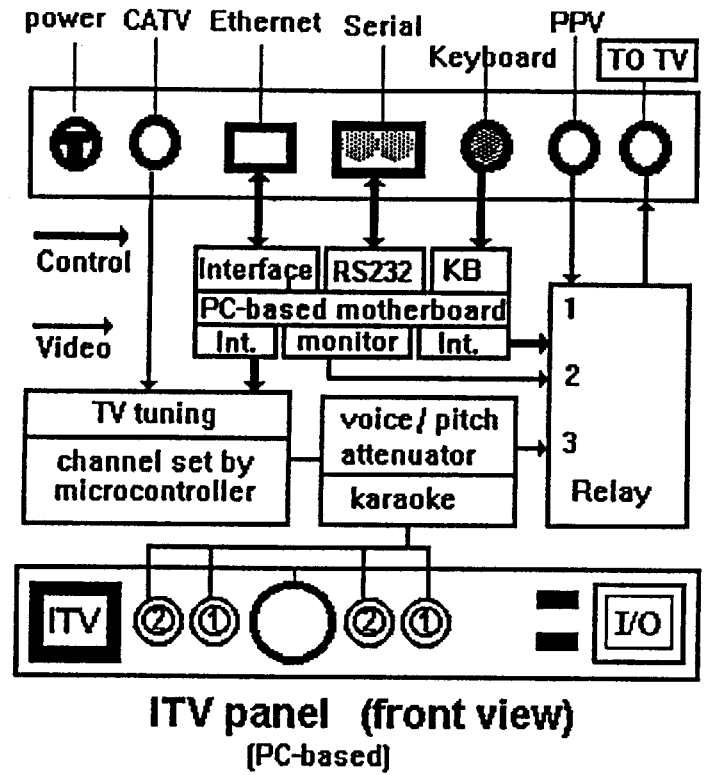
FIG. 6b is a block diagram of a PC-based iTVpanel in accordance with one embodiment of the present invention.
Figure 7:
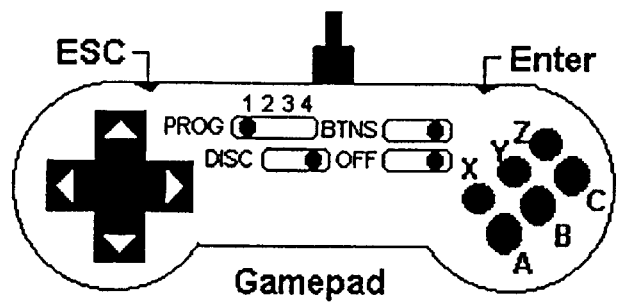
FIG. 7 is an elevational view of an iTVcontroller (i.e., the gamepad) in accordance with the present invention.

As shown in FIGS. 6a and 6b, the iTVpanel provides requisite TV tuning/demodulation and channel control for video, as well as switching for pay-per-view TV, keyboard interface and control interface as well as karaoke electronics. In FIG. 7 it will be seen that the iTVcontroller provides a simple user control mechanism "ESC" buttons or keys, touch pad direction (up, down, left and right) keys, function/letter keys, various program templates and disc controls for switching between keyboard mode and joystick mode, and an on/off key.

Starting Up

The iTVpanel contains a micro-processor to send and receive messages through RJ11 using RS422 link. On power up, iTVpanel performs an internal diagnostic test and then resets the internal state. The Channel-processor also is able to assess the iTVpanel current state information.

The iTVpanel Command Set
    iTVpanel to Channel Processor Commands
    1. Start Session Command: If iTVpanel receives two consecutive START key strokes from iTVcontroller and the current state is in ready (no current session), the iTVpanel sends the Start Session command to the Channel-processor and sets its current state to Session State. This allows the iTVpanel to send key stroke commands to the Channel-processor;
    2. Terminate Session Command: If iTVpanel receives two consecutive ESC key strokes from the iTVcontroller, and there is a current session, then the iTVpanel sends the Terminate Session command to the Channel-processor. In the mean time, the iTVpanel still sends regular key stroke commands to the Channel-processor. This is used to prevent accidental shut down of the session. After a preset time (e.g., 5 seconds), if the Channel-processor does not receive any other key stroke commands, then it will send a Reset Command to the iTVpanel to reset the iTVpanel to initial state;
    3. Key Stroke Command: If iTVpanel receives any command that is not Initiate or Terminate Session Commands, and the iTVpanel is in the Session state, then the Key Stroke Command is sent to the Channel-processor. Otherwise, the Key Stroke Commands are not sent to the Channel-processor to reduce the Channel-processor interrupt handling load.

The Channel-Processor to iTVpanel Commands
1. Reset Command: Reset the iTVpanel to initial state and terminate the current session;
2. Inquiry Command: Inquiry of the iTVpanel state information. if inquiry command time-out, then indicate the iTVpanel is not responding (defective or stolen);

3. Channel Switching Command: Switch the television to new channel number.

The iTVpanel has the following states:
1. Ready State (Initial State);
2. Wait State (Wait for the Channel-processor response);
3. Session State (A current session is established with Channel-processor);
4. Diagnostic State (Internal self diagnostic running, do not accept outside commands).

The Channel-processor has the following states:
1. Ready State (Initial State);
2. Wait State (Wait for the server to establish or terminate the session);
3. Session State.

The user first presses the START button twice, and the iTVpanel receives the key strokes. In normal conditions, the iTVpanel is in WAIT STATE and sends a START SESSION COMMAND to Channel-processor. Once the iTVpanel sends the command, it sets itself to SESSION STATE. The Channel-processor receives the SESSION COMMAND and sends a LOG-IN request to the iTVserver. Before sending the LOG-IN request, the Channel-processor sets itself into the WAIT STATE. Each iTVpanel is hardwired to a specific port on the Channel-processor. The iTVserver has a WIRE CONNECTION TABLE that describes the mapping between Channel-processor port and room number. This WIRE CONNECTION TABLE can be edited on the iTVserver with a utility program. By default, the wiring connection is described on the back of the serial port for room number. The LOG-IN command to the iTVserver has following syntax—(LOG-IN iTVstation_number Channel-processor_number iTVpanel_number). The iTVstation_number is currently not used because each Channel-processor has a unique network address. During the Channel-processor WAIT STATE, Channel-processor ignores the commands from the iTVpanel unless it receives the TERMINATE SESSION command.

The iTVserver receives the LOG-IN command, it uses the WIRE CONNECTION TABLE to obtain guest room number. The iTVserver sends a database query to the server Access database. If the room number is in the iTVserver database that has current guest information, then the guest information and the previous session information are retrieved. Otherwise, the iTVserver sends a request to the Hotel Guest Database through the provided database module, retrieves the guest room information and sets up an entry in the iTVserver database. If there is a previous session, the iTVserver will provide a GO TO PREVIOUS SESSION option during startup. The iTVserver then records the starting time for the session. The iTVserver sends an acknowledgment message to Channel-processor. The iTVserver records the (Channel-processor, iTVpanel) information in the GLOBAL CHANNEL TABLE to indicate that iTVpanel is connected to the GROUP-VIEWING iTVserver. If there is a previous session information, the previous session location is recorded and sent back to the Channel-processor. Initially, the iTVserver always allocates the GROUP-VIEWING STATION to guest request. The Channel-processor then records the previous session information and the GROUP-VIEWING iTVserver network address. The Channel-processor sets the key stroke routing destination to itself and establishes a connection to the GROUP-VIEWING iTVserver.

Once the connection is set and the Channel-processor receives the acknowledgment from the iTVserver, the iTV sends a SWITCH CHANNEL command to the iTVpanel to switch the TV to the assigned channel and sets itself into the SESSION STATE and will receive, process, and route the key stroke commands. Similarly, the iTVpanel switches the TV channel and sets itself to the SESSION STATE for processing iTVcontroller key strokes. If the previous session is available or the guest selects the PRIVATE VIEWING options, the Channel-processor will send the request to the iTVserver and request an available Channel-processor for private viewing. The Channel-processor will then set the key stroke command routing destination to the assigned Channel-processor network address. This situation is discussed hereinafter under the heading GROUP-VIEWING.

The Channel-processor and the Virtual Device Driver

The iTVpanel handles the command set through the on-board microprocessor and firmware. The Channel-processor needs to have a base virtual device driver (V×D) to interface with the multi-port serial board. The purpose of the V×D is to handle Channel-processor. It also acts a WIN95 keyboard and mouse driver in order to convert the keyboard commands into key and pointer messages to standard Windows applications. The V×D has the following capabilities:
1. Converts key stroke commands into keyboard and mouse messages in WIN95;
2. Routes key stroke commands to another Channel-processor through direct connect SCSI bus;
3. Routes key stroke commands to another Channel-processor or iTVserver on the Ethernet;
4. Sends commands to iTVpanel and sets its own states.

The sample implementation required on the Channel-processor includes:
1. V×D for routing key stroke messages;
2. Control module for initiating and responding iTVserver messages.

The sample implementation required on the iTVserver includes:
1. Build accounting database using Access;
2. Interface with the hotel central database;
3. Resource allocation module to handle channel allocation;
4. Log-in/Log-out module.

Group-Viewing

On each iTVcontroller, a graphical icon sticker is attached and this represents the guest's identity on the group-viewing channel. (A more sophisticated scheme to let guests select their own icon requires switching to a private-viewing channel.) The group-viewing channel is running a client/server program. The Channel-processor that connects to the guest iTVpanel does not route key stroke messages to another Channel-processor or iTVserver. It feeds the key stroke directly into the keyboard and mouse virtual device driver. The GROUP-VIEWING iTVserver updates the individual guest icon on the TV and carries out the group preview or group game on the screen. The group preview program describes how to use the control set, hotel and channel information, group game, and guided tour.

The group game provides an environment similar to a county fair environment. For example, it will provide a horse racing game where each participant pushes the iTV-controller to direct their horse icon direction and speed. If they trip each other, both will be disabled for 3 seconds. The guided tour allows individual guests to select items from a guided shopping tour. At any time, the guest can select a private viewing channel. If the guest has previously used the system, the previous session information is available on the iTV server. If the guest selects the Previous Session button, he or she will be connected to the previously visited area. Otherwise, the guest has the option to go to the Movie Theater, Arcade, Shopping Mall, office, or Front Desk. All these selections require the allocation of a private Channel-processor.

If the user chooses the Exit button or double presses the ESC key, the Channel-processor will send a request to iTVserver to terminate the session. The Channel-processor first sets itself into the WAIT STATE. If there is on key stroke commands from iTVpanel for 5 seconds, then Channel-processor actually sends the request to iTVserver. The iTVserver records the activity log into the guest account. Once the Channel-processor obtains the iTVserver response, the Channel-processor sends the Reset command to rest the iTVpanel to the READY STATE.

The sample implementation required for Group-viewing Program includes:
1. Client/Server group-viewing program development;
2. Group game title development;
3. Guided tour title development.

Private Viewing

When the guest selects any of the private options, without quitting the current GROUP-VIEWING CHANNEL, the Channel-processor sends a request to the iTVserver to request for a private Channel-processor. The Channel-processor sets itself into the WAIT STATE. The iTVserver uses the GLOBAL CHANNEL TABLE and uses the following channel allocation scheme:
1. If the Arcade is requested, then a Channel-processor in the same iTVstation as the client Channel-processor, is allocated; if this is not possible, then another Channel-processor is allocated;
2. If any other option is requested, a Channel-processor is allocated;
3. Avoid allocating a Channel-processor with more than one active iTVpanel session;
4. Non-profit private channel such as hotel check out or hotel information should be switched out to make room for new requests.

If all the channel have been allocated, then the GROUP-VIEWING iTVserver will display a full or busy icon for these private viewing options. Once a Channel-processor is allocated for private-viewing, the iTVserver acknowledges the Channel-processor's request and does the following things:
1. Updates usage type, time, and accounting status;
2. Sends the Channel-processor the allocate Channel-processor network address for local routing.

Once the Channel-processor client receives the routing information, the iTV processing channel sends a SWITCH CHANNEL command to the iTVpanel and sets itself into SESSION STATE. Depending on the private viewing channel, the Preview Information is displayed on the TV and informs the guest that he or she has 3 free minutes for previewing. If necessary, the program will ask for password or credit card information on the screen. From then on, all the iTVcontroller key stroke commands are routed by the connecting Channel-processor to the allocated Channel-processor either through Direct SCSI Bus or Ethernet.

Movie on Demand

The Move on demand module first displays a movie catalog page. If the guest clicks on a category, a catalog page is displayed with the following buttons at the bottom row:
1. Subscribe: subscribe to the movie for private viewing;
2. Preview: a two-minute private preview of a key episode;
3. Summary: a text description of the movie and comments by movie critics;
4. Search: a search engine to find the desirable title;
5. Go Back: go back to the previous level.

The movie information is stored in the iTVserver in a Microsoft Access database. In the database, we store the movie information and the path name for the MPEG file. If the movie selected is on the local hard disk (such as popular new releases), then the movie MPEG file is played. Otherwise, the movie file is downloaded from the iTVserver.

Once the guest subscribed to the movie, the accounting information is sent to the iTVserver to record the starting time. During the movie, if the guest presses the ESC button once, then a movie control panel is displayed on top of the movie. The guest can continue, pause, stop, rewind, forward, and slow the movie. After the movie is finished, the previous screen page is displayed. The guest can use the ESC key to go back to the previous page. If the user quits the private viewing program, the Channel-processor sends a request to the iTVserver to free the private-viewing channel. The iTVserver updates the activity log and sends the user to the group-viewing channel again. This includes setting the Channel-processor key stroke routing table and switching the iTVpanel channel.

The sample implementation for movie-on-demand includes:
1. MPEG movie production;
2. Movie catalog user interface;
3. MCI interface to play and control MPEG movies;
4. Overlay the movie control panel on top of the MPEG movie;
5. Multimedia database development for Access database.

Game on Demand

Game-on-demand is similar to the movie-on-demand case. A key map is added to the database such that if a game is subscribed, virtual key map is also loaded to the Channel-processor to convert the keys for game play.

Shopping on Demand

The shopping-on-demand contains the guided tour, individual store, or category pages. Guests can take a guided tour, browse the category pages, or go to a shopping mall to visit individual shops. At any time, the guest can ask for a summary of the current purchase. Individual item image, name, and price will be displayed. When the guest presses the Pay button, the Channel-processor sends a request to the iTVserver and records all the purchase items. After the purchase, the guest can continue to go to another private-viewing channel. Part of the shopping function is tied to the group-viewing channel. If no more private channels are available, the shopper may be switched to the group-viewing channel.

The implementation required for shopping-on-demand includes:
1. Develop guided tour shopping title;
2. Develop shopping mall title;
3. Add calculation module for current purchase.

Office on Demand

The guest can borrow a regular computer keyboard from the front desk and use it to do remote access, send a fax, connect to the Internet, or engage in a local chat channel. The charge is based on the service type and duration.

The sample implementation required for office-on-demand includes:
1. Install Internet server and handling connections
2. Connect fax modem on the network;
3. Automatically download news to local server.

Hotel Information on Demand

Customized hotel service information is also accessible using Intranet server. Guests can freely access this information and be able to check out and request room service.

The sample implementation required for hotel information-on-demand includes:
1. Install Intranet server based on the Internet server;
2. Develop and customize hotel information title;

3. Link with hotel computer system for room services and other guest requests.

The Preferred Teampro iTVSystem for Community

Reference will now be made to FIGS. 8–12 which illustrate as one of the typical TeamPro community iTVsystem solutions for as many as 64,000 users.

Figure 8:
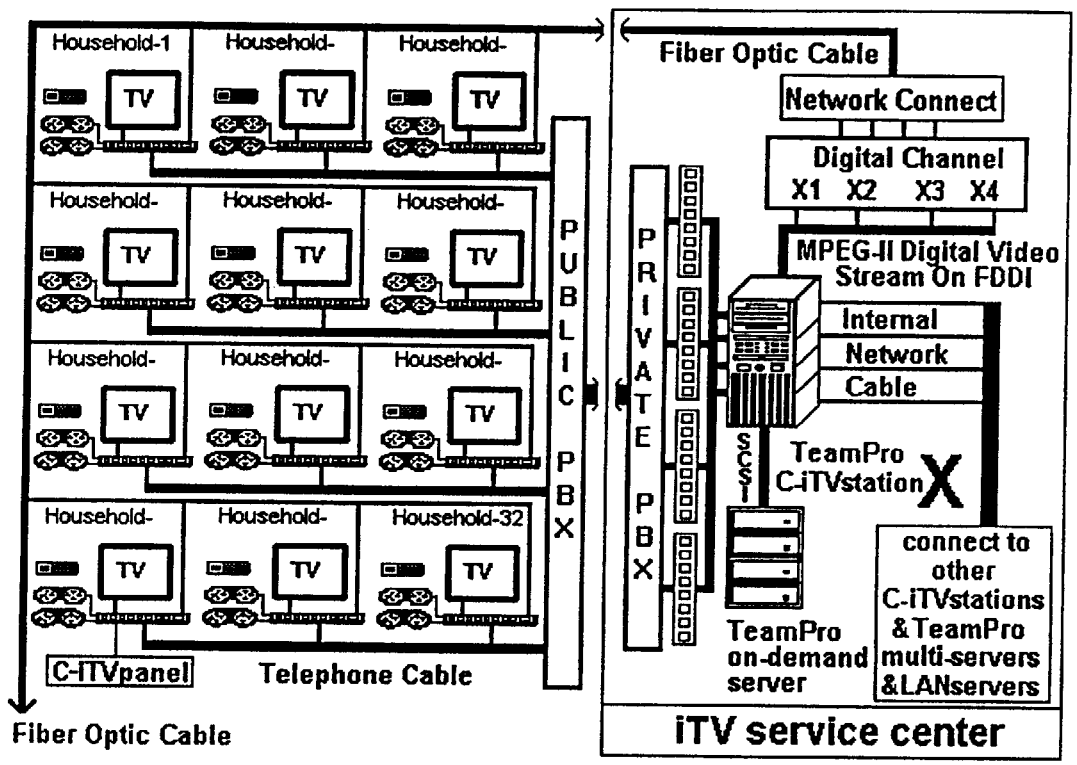
FIG. 8 is a block diagram of the present invention illustrating the basic building block of a community iTV-system: a C-iTVstation thereof in a typical system installation for 32 up to 64 users.

As seen in FIG. 8, each household in the community is equipped with the C-iTVpanel (set-top-box), which can generate out-going toll-free calls to the iTV service center when the service is activated by the attached remote control. The iTV service center is equipped with many TeamPro C-iTVstations.

Each C-iTVstation has four Channel-processors and each processor can receive and handle eight telephone communications. Each TeamPro C-iTVstation is also equipped with the direct-access on-demand workgroup server that provides concurrent MPEG-II multimedia database sharing for four processors to generate full-motion full-screen video. Therefore, each TeamPro C-iTVstation creates 4 private-viewing interactive TV channels for private on-demand services, such as movie-on-demand, game-on-demand, shopping-on-demand and office/Information-on-demand. The private-viewing channel is interactively operated by only one user. Each TeamPro C-iTVstation can communicate with other TeamPro C-iTVstations and the TeamPro multi-server systems through the internal network link.

Every TeamPro Multi-server system can be configured to provide 2 iTVservers that create two group-viewing interactive TV channels for group services, such as group shopping and group games. This group-viewing channel is programmed and operated by the iTVserver itself, but in every program, it can interact with a number of users as participants, whose representative icons are shown on the TV screen. It can also interact with as many wait-in-line viewers, whose icons are not shown. Also, the TeamPro Multi-server system can also be configured as the LAN servers that provide the shared data base services for all the Channel-processors and iTVservers.

Figure 9:
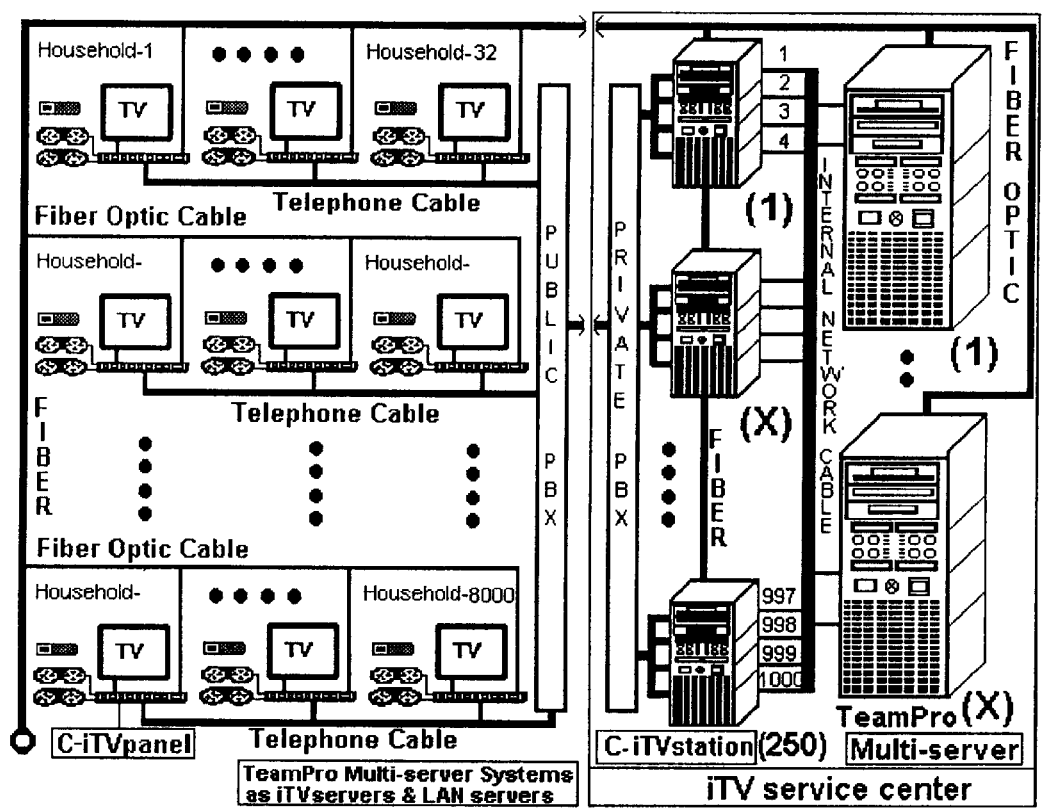
FIG. 9 is a block diagram of a community iTVsystem of the present invention configured for use by up to 8,000 users.

Every group-viewing channel and every private-viewing channel can all be accessed by any of the community users through the C-iTVpanel (set-top-box) equipped in every household. As illustrated in FIG. 9, there are 250 TeamPro C-iTVstations that create 1,000 private-viewing interactive TV channels and a number of TeamPro Multi-server systems that provide a number of iTVservers for group-viewing interactive TV channels and a number of LAN servers for data base services.

Figure 10:
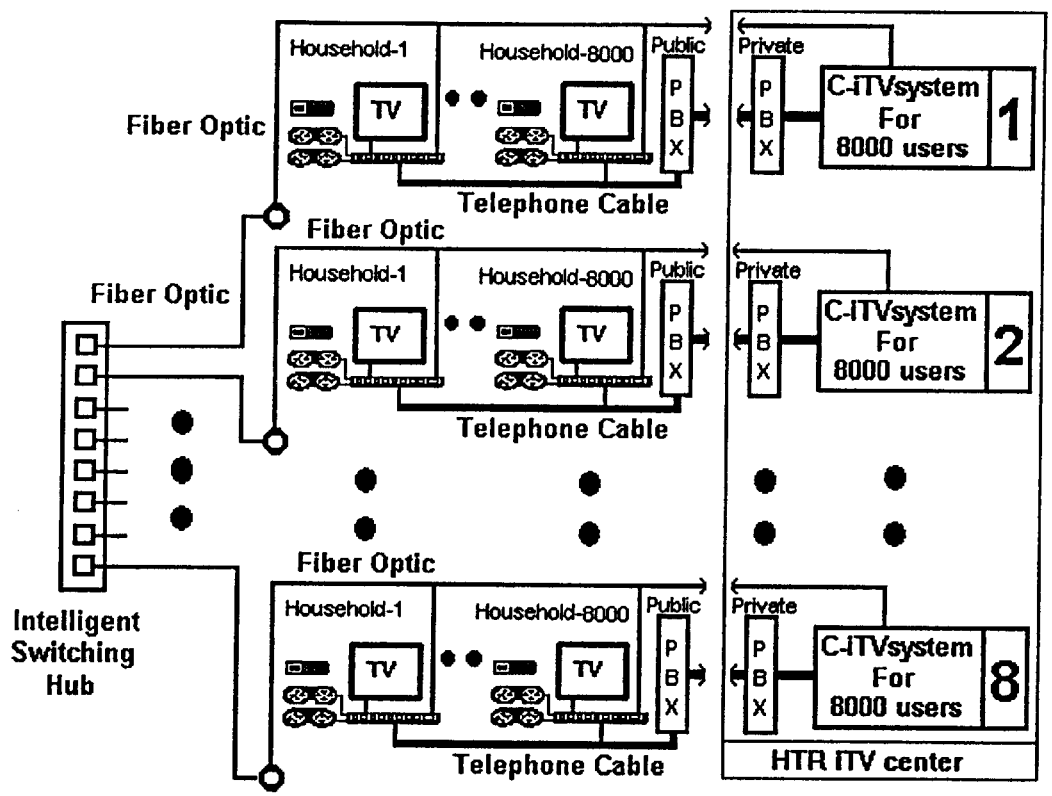
FIG. 10 is a block diagram of a community iTVsystem of the present invention configured for use by up to 64,000 users.
Figure 11:
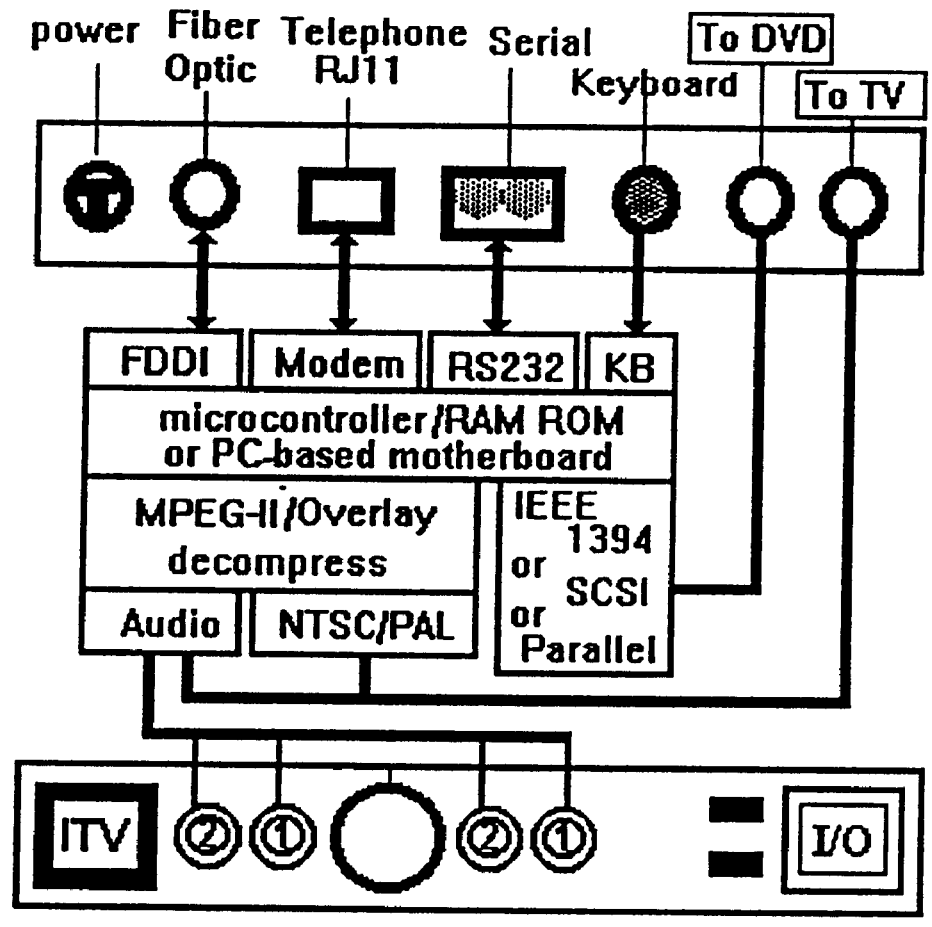
FIG. 11 is a block diagram of an iTVpanel for a community iTVsystem in accordance with a second embodiment of the invention.

As illustrated in FIG. 10, there are eight different segments of Fiber Optic, which are linked through a digital intelligent switching hub. Every channel in each segment can be accessed by any household in another segment. As a result, the equipment usage rate will be optimized. Whenever the Fiber Optic Wide Area Network (WAN) backbone is established, the TeamPro C-iTV service can be rendered not only to the local community, but also to the entire WAN area. As shown in FIG. 11, the C-iTVpanel for a community group version of the invention is similar to that of FIG. 7 except for modifications for MPEG-II, fiber optic, modem and digital interfaces. The iTVcontroller is identical to FIG. 8.

System Operation

Each household is equipped with the C-iTVpanel (set-top-box), which is hooked up with a keyboard and two gamepads, wired or wireless. The C-iTVpanel can generate the out-going toll-free phone connection to the iTV service center when the service is activated by pressing the "Enter" key on the keyboard or gamepad.

The iTV service center is equipped with many TeamPro C-iTVstations. Each C-iTVstation has 4 Channel-processors and each processor can receive and handle from eight up to sixteen incoming telephone communications through modems.

Once the telephone communication is established between the calling C-iTVpanel and any of the four Channel-processors of a TeamPro C-iTVstation in the iTV service center through the PBX using modem, the linked Channel-processor will send a request through the internal network cable (for example, 100 megabit Ethernet) to the master iTVserver that keeps a constantly-updated status table of all the "seats" available in all of the group-viewing channels.

Once the "seat" is found and reserved, the Channel-processor sends the log-in information of the subscriber (such as the Fiber optic IP address, the pre-determined representative icon and the telephone number) through the internal network cable to the specific iTVserver that provides the seat. That iTVserver receives and acknowledges the request, then generates the subscriber's icon on the screen, and sends an enable-receiving FDDI command through the Fiber optic cable to the subscriber's C-iTVpanel, so the C-iTVpanel can receive the MPEG-II video stream that is generated and multi-cast by that server.

The C-iTVpanel receives and decompresses the MPEG-II video stream, then displays it on the TV. If coupled with the DVD, the C-iTVpanel simply receives the MPEG video stream and downloads to the DVD through the internal C-iTVpanel link to external devices using USB, SCSI, or Parallel interface. The DVD can then decompress the video stream and display it on the TV. Therefore, in either way, the subscriber can see his or her icon on the TV screen. The subscriber can interact through the keyboard or gamepads that are hooked up to the C-iTVpanel, wired or wireless. The linked Channel-processor will redirect all the following interactive control signals generated from the C-iTVpanel to that specific iTVserver, which provides the group on-demand service that contains a "Cyber-Fair", infomercials and commercials.

Every TeamPro multi-server system contains two iTVservers that create 2 group-viewing interactive TV channels. Each interactive group-viewing channel can accommodate a number of "seats" that are filled with different individual icons. Each subscriber can choose to participate in the game or in the forum, buy merchandise or simply do nothing.

If all the seats in the group-viewing channels are occupied, the next subscriber will be classified as one of the "wait-in-line viewers", who have the option of:

1) Scanning through all group-viewing channels to find the ideal channel;
2) pressing the "wait-in-line" function key to notify the attached server, so the waiting-in-line process can be started. Once any empty seat is available because of a departure, the wait-in-line viewer can take up that empty seat and enjoy playing interactively.

On the TV screen, there is an icon that shows the availability of the private-viewing channel. Between each group session, the iTVserver will check with the master TeamPro iTVserver, which keeps the status table of all the available private-viewing channels. If there is one available, then the iTVserver will reserve it and at the same time light up the availability icon. Any of the subscribers in the group can choose to go into the private-viewing channel simply by pressing any one of the "Arrow" keys that are on both the keyboard and the gamepad. If there is more than one request, the iTVserver will go to master iTVserver again. If there is another available, then the iTVserver reserves and assigns to the second subscriber that has made the request, and so on. If there is none available from the status table, the request will be postponed until next session break but with the highest priority.

Once the iTVserver receives the "Arrow" signal from the subscriber, it sends out the log-in information of that subscriber to the reserved private-viewing channel controlled by a Channel-processor of a TeamPro C-iTVstation. And at the same time, it notifies the previous linked Channel-processor to disconnect the linkage from the subscriber's C-iTVpanel, so the C-iTVpanel can link with the newly-assigned Channel-processor that provides the private-viewing channel for the subscriber.

That reserved private-viewing Channel-processor dials out the subscriber's telephone number and re-establishes the linkage with the subscriber's C-iTVpanel through a modem. When the connection is set up, the Channel-processor sends an enable-receiving command through Fiber Optic cable to the iTVpanel, so the C-iTVpanel can receive the MPEG-II video stream generated by the Channel-processor.

Each TeamPro C-iTVstation is also equipped with the direct-access on-demand workgroup server. The direct-access no-demand workgroup server provides the concurrent multimedia database sharing for four Channel-processors to generate the full-motion full-screen video. Its size can be from 23 Gigabytes to 92 Gigabytes, providing more than 48-hours of non-stop video.

The subscriber's C-iTVpanel receives and decompresses the MPEG-II video stream from the private-viewing channel and displays it onto the TV. The first screen the subscriber will see in the private-viewing channel provides the summary icons of all of the private-on-demand services offered by the attached direct-access on-demand workgroup server. There are a number of private-on-demand services available, such as movie-on-demand and game-on-demand. The subscriber can use the arrow key to move the cursor to the desired service and then activate the service by pressing "Enter".

There are other private-on-demand services that are offered by a number of LAN servers, such as a CD-ROM server and a (digital video disk) DVD-server. For example, the subscriber can order any of the movies that reside on a CD-ROM or a DVD server and schedule the time to play it. Then, the servers will download the MPEG-II data stream to the Channel-processor's local disk hard drive through the internal network link. Once it is ready, the subscriber can activate the service any time after the scheduled time he/she wants it.

The subscriber can press "ESC" button twice to log out at any time. When the subscriber is in the group-viewing channel, the iTVserver acknowledges it. Then, during the session, the subscriber's icon on the seat is removed, the transaction records, if any, are sent to the accounting server, and the disable-receiving command is sent to the C-iTVpanel, so the CiTV-panel will not receive any MPEG-II video stream. When the subscriber is in the private-viewing channel, the Channel-process will acknowledge it and or directly to the closing menu that shows a list of unpaid periodic transaction records. The subscriber confirms it again by pressing "ESC" twice. The Channel-processor will send the transaction records to the accounting server and send the disable-receiving command to the C-iTVpanel to end the receiving.

The non-interactive public-viewing channel, such as Direct-TV or CATV channels and the like, can be installed as follows:

(1) Each non-interactive public-viewing channel resides on one TeamPro iTVserver, so that the video image can be broadcast to the C-iTVpanel in every household;
(2) as a content service for the private-viewing interactive channel user to select;
(3) these public-viewing channel signals can be handled through the C-iTVpanel's bypass port and be displayed onto the TV.

The TeamPro C-iTVsystem can create more channels on the same digital video carrier than other iTV systems can. If, for example, it can create 1,200 channels, then the ideal channel arrangement in a community will be:

1. The non-interactive public-viewing TV channels: 2–49;
2. the interactive group-viewing TV channels: 50–199, (the channel that the subscriber receives, is assigned and allocated by the TeamPro iTVservers);
3. the interactive private-viewing TV channels: 200–1199 (the channel that the subscriber receives, is assigned and allocated by the TeamPro C-iTVstations).

Having thus described preferred embodiments of the invention, what is claimed is:

1. An interactive television system comprising:
    a plurality of workgroup systems each having a media server connected to a plurality of Channel-processors, each of said Channel-processors being connected through an internal link to a plurality of control panels, each said control panel being connected to a television receiver;
    said Channel-processors of each said workgroup system being interconnected to each other and to all Channel-processors of each other said workgroup system whereby each said television receiver can be controlled to receive video signals from any media server of any workgroup system of said plurality of workgroup systems.

2. The interactive television system recited in claim 1 wherein said media server is taken from the group consisting of a direct-access workgroup server and a LAN server.

3. The interactive television system recited in claim 1 further comprising at least one central media server connected by a network link to each of said Channel-processors.

4. The interactive television system recited in claim 3 wherein said network link comprises an Ethernet link.

5. The interactive television system recited in claim 1 wherein said internal link comprises a telephone modem link.

6. The interactive television system recited in claim 1 wherein said internal link comprises a PBX telephone link.

7. The interactive television system recited in claim 1 further comprising a video link from all channel-processors to all said control panels.

8. The interactive television system recited in claim 7 wherein said video signals are delivered to said control panels by said video link which comprises a radio frequency cable.

9. The interactive television system recited in claim 7 wherein said video signals are delivered to said control panels by said video link which comprises a fiber optic cable.

10. The interactive television system recited in claim 1 further comprising a workgroup link from the media server to said Channel-processors in each said workgroup system.

11. The interactive television system recited in claim 1 wherein each said workgroup system is housed in a unitary chassis having a single power supply.

12. An interactive television system comprising:

a plurality of set-top boxes for local control of channel selection, said plurality being segregated into a plurality of local groups of set-top boxes;

a plurality of Channel-processors forming a workgroup, each such Channel-processor being associated with a respective local group of set-top boxes by a first link connection;

a direct-access workgroup server connected to said Channel-processors by a second link for operating said Channel-processors interactively as a workgroup; and a channel-oriented interactive multimedia LAN server connected to said plurality of Channel-processors by said first link connection.

13. The interactive television system recited in claim 12 further comprising a general LAN server connected to said plurality of Channel-processors by said first link connection.

14. The interactive television system recited in claim 12 further comprising a video delivery link connection and wherein said channel-oriented multimedia interactive LAN server is connected by said video delivery link connection to all said set-top boxes.

15. The interactive television system recited in claim 14 wherein each of said Channel-processors is also connected to said video delivery link connection.

16. The interactive television system recited in claim 12 further comprising a data control link for connecting each such Channel-processor to a respective group of said set-top boxes for data communications therebetween.

17. An interactive multimedia system comprising:

a plurality of first-group computers for local control of channel selection, said plurality being segregated into a plurality of local groups of first-group computers;

a plurality of second-group computers forming a workgroup, each such second-group computer being associated with a respective local group of first-group computers by a first link connection;

a direct-access workgroup server connected to said second-group computers by a second link for operating said second-group computers interactively as a workgroup; and a LAN server connected to said plurality of second-group computers by said first link connection.

18. The interactive multimedia system recited in claim 17 further comprising a video delivery link connection and wherein said LAN server is connected by said video delivery link connection to said first-group computers.

19. The interactive multimedia system recited in claim 18 wherein each of said second-group computers is also connected to said video delivery link connection.

20. The interactive multimedia system recited in claim 17 further comprising a data control link for connecting each second-group computer to a respective group of said first-group computers for data communications therebetween.

\* \* \* \* \*